United States Patent Office 2,752,345
Patented June 26, 1956

2,752,345

GENTISIC ACID SALTS OF AMINOALKYL-PHENTHIAZINES

Walther Persch, Frankfurt am Main Hochst, Germany, assignor to Cassella Farbwerke Mainkur Aktiengesellschaft, Frankfurt am Main-Fechenheim, Germany, a German company No Drawing. Application December 2, 1952,
Serial No. 323,719

Claims priority, application Germany December 21, 1951

2 Claims. (Cl. 260—243)

This invention relates to therapeutically valuable salts and a process for producing same.

In the use of antihistamines of the type of phenothiazine being substituted on the nitrogen atom by a basic residue, and when these antihistamines are to be used for special purposes, it has proved to be of advantage to use them in combination with gentisic acid.

It has now been found that the aforesaid basic phenothiazine derivatives give veritable salts with gentisic acid. These salts can be produced according to methods common in practice for this type of reaction, e. g. by a simple adding of the components in suitable solvents, or by a double reaction, e. g. from the hydrochloric salt of the aminoalkyl-phenothiazine and gentisic sodium.

The following example illustrates the invention.

Example 14.9 grams of N-diethyl-aminoethyl-phenothiazine and 7.7 grams of gentisic acid are boiled in 20 ccm. of alcohol for half an hour. The alcohol is then evaporated. The residue which has the form of an oil crystallizes slowly. The hard crystal cake is recrystallized from 250 ccm. of acetic ester and 10 ccm. of alcohol. The product separated by crystallizing is the chemically pure gentisic salt of the N-diethylamino-ethyl-phenothiazine having the melting point of 148–149° and corresponding to the formula

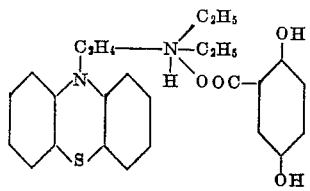

The same effect is obtained when the diethylamino-ethyl-phenothiazine is replaced by a phenothiazine derivative containing instead of the ethyl groups other low alkyl groups, as e. g. methyl or propyl.

I claim:

1. As therapeutically valuable salts the gentisic acid salts of dialkyl-aminoalkyl-phenothiazines of the formula

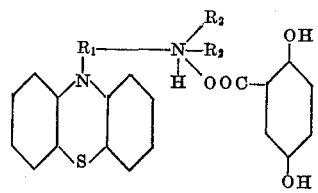

wherein $R_1$ and the $R_2$'s are lower alkyl radicals.

2. As therapeutically valuable salt the gentisic acid salt of diethylaminoethylphenothiazine of the formula

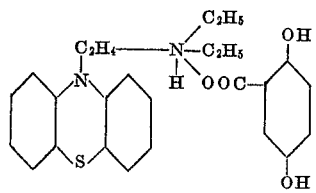

References Cited in the file of this patent

UNITED STATES PATENTS

| 2,519,886 | Charpentier | Aug. 22, 1950 |
| 2,590,125 | Robinson et al. | Mar. 25, 1952 |

FOREIGN PATENTS

| 689,835 | Great Britain | Apr. 8, 1953 |
| 916,290 | Germany | Aug. 9, 1951 |

OTHER REFERENCES

Idson: "Chem. Rev." (December 1950), vol. 47, No. 3, pp. 491–8.

Gilman et al.: "Jour. Am. Chem. Soc." (1944), vol. 66, pp. 888–92.